United States Patent
Laursen (10) Patent No.: US 10,161,288 B2
(45) Date of Patent: Dec. 25, 2018

(54) TAIL PIPE MOUNTING ARRANGEMENT

(71) Applicant: Cisma Solutions ApS, Silkeborg (DK)

(72) Inventor: Søren Kroun Laursen, Egtved (DK)

(73) Assignee: CISMA SOLUTIONS APS, Silkeborg (DK)

( * ) Notice: Subject to any disclaimer, the term of this patent is extended or adjusted under 35 U.S.C. 154(b) by 375 days.

(21) Appl. No.: 14/970,364

(22) Filed: Dec. 15, 2015

(65) Prior Publication Data

US 2017/0022874 A1 Jan. 26, 2017

(30) Foreign Application Priority Data

Jul. 23, 2015 (DE) .................... 20 2015 103 869 U (51) Int. Cl.
*F01N 13/08* (2010.01)
*F01N 13/18* (2010.01)
*F16L 37/08* (2006.01)

(52) U.S. Cl.
CPC ....... *F01N 13/082* (2013.01); *F01N 13/1805* (2013.01); *F01N 13/1811* (2013.01); *F01N 13/1855* (2013.01); *F16L 37/082* (2013.01)

(58) Field of Classification Search
CPC ... F16L 37/082; F16L 37/0987; F01N 13/082; F01N 13/1855; F01N 13/1805; F01N 13/1811
USPC ................ 285/62, 404, 319; 181/227, 228
See application file for complete search history.

(56) References Cited

U.S. PATENT DOCUMENTS

| | | | | |
|---|---|---|---|---|
| 2,771,908 A | * | 11/1956 | Wilson | F01N 13/082 |
| 3,642,094 A | * | 2/1972 | Yancey | 181/227 |
| 5,366,256 A | * | 11/1994 | Pruzin | 285/62 X |
| 2003/0168855 A1 | * | 9/2003 | Kaminski | F16L 37/0987 |
| | | | | 285/319 |
| 2004/0084247 A1 | * | 5/2004 | Kishida | 181/227 |
| 2007/0271911 A1 | * | 11/2007 | Stadler | F01N 13/082 |
| 2010/0212767 A1 | * | 8/2010 | Derry | F01N 13/082 |
| | | | | 181/227 X |
| 2017/0009637 A1 | * | 1/2017 | Schwarz | F01N 13/082 |

FOREIGN PATENT DOCUMENTS

| | | |
|---|---|---|
| CN | 202 402 119 U | 8/2012 |
| CN | 203 756 298 U | 8/2014 |
| DE | 10 2013 017 947 A1 | 5/2015 |
| JP | 2000 337 126 A | 12/2000 |
| WO | 2014/071950 A1 | 5/2014 |

\* cited by examiner

*Primary Examiner* — Greg Binda
*Assistant Examiner* — Zachary T Dragicevich
(74) *Attorney, Agent, or Firm* — Hackler Daghighian Martino & Novak (57) ABSTRACT

An exhaust tailpipe mounting system for mounting on an exhaust pipe end includes a tailpipe and a ring member attached to the tailpipe. At least three spring elements are attached to the ring member, wherein each spring element extends generally along a longitudinal axis and is bent into a wave shape. Each spring element has a proximal end opposite a distal end, where the proximal end is attached to the ring member and the distal end has at least one pointed end configured to grip into an outer surface of the exhaust pipe end. Each spring element has a first, second, third, fourth, fifth, sixth and seventh bend zone starting from the proximal end and respectively going to the distal end. The at least one pointed end of is angled at an angle of 75° to 85° in relation to the longitudinal axis of the spring elements.

10 Claims, 4 Drawing Sheets

TAIL PIPE MOUNTING ARRANGEMENT

CROSS-REFERENCE TO RELATED APPLICATIONS

This application claims priority to German Patent Application No. 20 2015 103 869.0, filed Jul. 23, 2015, the entire contents of which are hereby incorporated by reference.

DESCRIPTION

Field of the Invention

The present invention relates to a tail pipe mounting arrangement for mounting of a tail pipe to an exhaust pipe on automotives, such as cars and trucks.

BACKGROUND OF THE INVENTION

Tail pipes, i.e. the outermost end of an exhaust pipe, are also called trims. Tail pipes are often mounted on exhaust pipes of automotive vehicles, such as trucks or cars, to provide a certain design on the rear end of the automotive, in particular cars.

When mounting tail pipes to an exhaust pipe of automotive vehicles, it is known to use screw connections for fastening the tail pipe to the end of the exhaust pipe, e.g. by providing a number of screws, typically at least three, usually four, spread equally around the circumference of the connection end of the tail pipe.

When tightening the screws the screws need to be tightened equally or there is a risk that the tail pipe is not aligned properly with the exhaust pipe. In addition there is a risk of over tightening one or more of the screws, which may result in deformation of the tail pipe and/or the exhaust pipe.

Previously known spring based tail pipe mounting systems uses three springs arranged equally around the inner circumference of the tail pipe. The springs have a W-like wave structure with two upward waves and two downward waves and barb-like members at the distal end of the spring member. The barb-like members grips into the surface of the exhaust pipe. Every bend zone along the spring member has the same bending radius of approximately 2.5 mm. This results in an extremely high assembly force needed when pushing the tail pipe onto the end area of the exhaust pipe.

When mounting tail pipes to an exhaust pipe of automotive vehicles, it is also known to use pipe clamps. Several exhaust pipe clamps are known. The known pipe clamps usually comprise a belt part intended to extend around the pipes to be connected. In addition, the prior art pipe clamps have a flange at each end of the belt portion. Usually the flanges are provided with one or more holes for the fastening means, e.g. a bolt and a nut.

An example of an exhaust clamp, which is suitable for mounting of tail pipes to exhaust pipes, is disclosed in WO 2014/071950 A.

These types of clamps effective in mounting the tail pipe to the exhaust pipe by means of a telescopic pipe connection, around which the pipe clamp is provided for attachment of the tail pipe to the exhaust pipe. Such pipe connection between the tail pipe and the exhaust pipe may however be visible, depending on the design of the rear end of the vehicle, e.g. the rear bumper region.

In addition, the use of a tail pipe clamp requires effective tightening using tools. In addition the use of a pipe clamp requires that the clamp is properly aligned on the telescopic pipe connection between the tail pipe and the exhaust pipe. This renders the mounting of a tail pipe time consuming and complex.

Thus it is an object of the present invention to provide an exhaust tail pipe mounting system which effectively mounts the tail pipe on an exhaust pipe.

It is also an object of the present invention to provide an exhaust tail pipe mounting system, which reduces the risk of crashing of the springs and/or deformation of the tail pipe and/or the exhaust pipe during mounting of the tail pipe on the exhaust pipe.

It is also an object of the present invention to provide an exhaust tail pipe mounting system, which requires a low assembly force when mounting the tail pipe on the exhaust pipe, while maintaining a high pull force is needed for pulling the tailpipe of the exhaust pipe.

It is also an object of the present invent ion to provide an exhaust tail pipe mounting system, which is theft-proof.

It is also an object of the present invention to provide an exhaust tail pipe mounting system, which requires less or no tools for mounting of the tail pipe on the exhaust pipe.

Thus, it is also an object of the present invention to provide an exhaust tail pipe mounting system, which renders automation of mounting of the tail pipe possible, e.g. by use of robots.

SUMMARY OF THE INVENTION

These objects are met by an exhaust tailpipe mounting system for mounting of a tail pipe on an exhaust pipe end comprising a spring arrangement of at least three spring elements which are attachable to the tailpipe, wherein each spring element is bent into a wave shape. Each of the springs comprises a first end having a connection end part intended for connection to an inner surface of a tailpipe, and a second end forming a distal end gripping part, comprising at least one cut-out at the distal end of the spring for forming at least two pointy ends, and where the pointy ends of the gripping part is intended for gripping into an outer surface of an exhaust pipe.

The wave shape of each spring is defined by a first bend zone between the connecting end part and a first downward wave part, where the first downward wave part comprises a second and a third bend zone. The second bend zone has a bending radius of 2.5 mm to 5.5 mm (at the lower side of the spring) and the third bend zone has a bending radius of 2.0 mm to 3.0 mm (at the upper side of the spring). A first upward wave part has a fourth bend zone, a second downward wave part has a fifth bend zone and a sixth bend zones, where the fifth bending radius is at least 8.0 mm at the upper side of the spring and where the sixth bend zone has a bending radius of 2.0 mm to 3.0 mm (at the lower side of the spring), and where the second downward wave part is followed by a second upwards wave part having a seventh bend zone, which connects the second downward wave part and the distal end gripping part, where the seventh bend zone connects the distal end gripping part to an upwardly extending spring part between the sixth and the seventh bend zone at an angle of 35° to 45°, and where the distal end gripping part is angled at an angle of 75° to 85° in relation to the longitudinal axis of the spring.

Hereby is obtained an exhaust tail pipe mounting system which effectively and easily mounts the tail pipe on an exhaust pipe. The low assembly force needed for applying the tail pipe to the exhaust pipe results in a low risk of deformation of the tail pipe and/or the exhaust pipe during mounting of the tail pipe on the exhaust pipe. In addition the risk of causing deformation of the tail pipe and/or the exhaust pipe due to over tightening of clamps is eliminated.

Further, a low assembly force reduces the risk of destroying any of the springs and a low risk of errors when mounting tail pipes due to deformation or crushing of one or more springs. Further, less or no tools are required for mounting of the tail pipe on the exhaust pipe. Further, a low assembly force is required when mounting the tail pipe on the exhaust pipe, while maintaining a high pull force is needed for pulling the tailpipe of the exhaust pipe. The high pulling force also results in a theft-proof mounting system, as it is in practice almost impossible to pull the tail pipe of the exhaust pipe without tools.

Thus, the exhaust tail pipe mounting system, is also suitable for automation of mounting of the tail pipe possible, e.g. by use of robots.

A number of springs are attached at their connection end part to the inner surface of the tail pipe, e.g. by welding, brazing or the like permanent attachment means. The springs are mounted with the barbs at the distal end towards the outer end of the tail pipe and the connecting part towards the end from which the tail pipe is mounted on the exhaust pipe.

When the springs are attached to the tail pipe the tail pipe is simply pushed onto the end of the exhaust pipe for mounting of the tail pipe in a direction in which first downwardly extending wave part of the spring engages the exhaust pipe at first, followed by the second downwardly extending wave part and finally the barbs at the distal end engages the exhaust pipe. The springs are thus arranged between the tailpipe and the exhaust pipe. The upwardly extending wave parts rest against the inner surface of the tail pipe while the horizontal spring part of the downwardly extending wave parts rest against the outer surface of the exhaust pipe and provides a frictional grip against the outer surface of the exhaust pipe.

Certain aspects of the spring are important for maintaining a high pulling force and obtaining a low assembly force.

The spring elements generally have a W-like shape between a connecting part at a first end of the spring intended for connection to an inner surface of a tailpipe and second end with a hook-like end gripping part.

The hook-like end gripping part comprises at least one cut-out at the distal end of the spring for forming at least one or preferably two pointy ends acting as barbs. The barbs dig into the outer surface of the exhaust pipe to secure that the tail pipe cannot fall off the exhaust pipe.

The first and second downwardly extending wave parts of each spring element are intended for resting against the outer surface of the exhaust pipe and thus align the position of the tail pipe on the exhaust pipe.

The first and second upwardly extending wave part of each spring element are intended for resting against the inner surface of the tail pipe and thus also assists in aligning the position of the tail pipe on the exhaust pipe.

In addition, the second downwardly extending wave part and the and outermost second upwardly extending wave part build up the force acting on the barbs at the gripping part at the distal end of the spring element and thus assists in increasing the hooks grip force into the exhaust pipe's outer surface.

The W-like shape between the first end and the second end is provided by bending a rectangular spring steel member at a number of bend zones. The bends zones are provided perpendicularly or substantially perpendicularly to the longitudinal axis of the spring element.

The first bend zone connects the connecting part to the first downwardly extending wave part. The first downwardly extending wave part comprises a second and a third bend zone resulting in a downward inclined spring part, a horizontal spring part and an upwardly inclined spring part which provides the downwardly extending wave shape.

The first upwardly extending wave part has a fourth bend zone, which connects the inclined spring parts of the first and the second downwardly extending wave parts.

The second downwardly extending wave part has a fifth bend zone and a sixth bend zone resulting in a downward inclined spring part, a horizontal spring part and an upwardly inclined spring part which provides the second downwardly extending wave shape.

The second downward wave part is followed by a second upwardly extending wave part having a seventh bend zone. The seventh bend zone connects the distal inclined spring part of the second downwardly extending wave part and the distal end gripping part.

At the first downwardly extending wave part, the second bend zone has a bending radius of 2.5 mm to 5.5 mm (at the lower side of the spring) resulting in an initial assembly force of approximately 100-200 N. The second bend zone is the first part of the spring which contacts the outer surface of the exhaust pipe when mounting the tail pipe resulting in an initial assembly force needed for sliding the lower surface of the first downward wave part over outer surface of the exhaust pipe. Thus, the size of the radius at the second bend zone is important for adjusting the assembly force while also maintaining dimensional stability of the spring. An increase in bending radius at the second bend zone decreases the assembly force needed for pushing the tail pipe with the springs attached to the inner surface onto the exhaust pipe, especially when the first downwardly extending wave part of the springs is passed into contact with the outer surface of the exhaust pipe. However if a large radius is used at the second bending zone the spring becomes less dimensionally stable or less stiff.

The third bend zone and the sixth bend zones have a bending radius (at the upper side of the spring) of 2.0 mm to 3.0 mm and preferably 2.4 mm to 2.6 mm in order to maintain shape and stiffness of the spring. In addition sufficient tension to the spring is provided to allow proper alignment of the tail pipe in relation to the exhaust pipe when mounted thereon.

The fifth bend zone is the first part of second downward wave part of the spring which contacts the outer surface of the exhaust pipe when mounting the tail pipe resulting in an intermediate increase of the assembly force needed for sliding the lower surface of the second downward wave part over outer surface of the exhaust pipe.

At the fifth bending zone, the bending radius (at the upper side of the spring) is at least 8.0 mm and preferably 8.0 mm to 15 mm, or more preferred 10.5 mm to 12.5 mm. Hereby, when the second downward wave part comes into contact with the outer surface of the exhaust pipe the intermediate assembly force is in the range of approximately 100-200 N. The size of the radius at the fifth bend zone is important for reducing the stepwise intermediate increase in the assembly force when the horizontal part of the second downwardly extending wave part of the springs is passed into contact with the outer surface of the exhaust pipe. An increase in bending radius at the fifth bend zone results in a reduced increase in the assembly force needed for pushing the tail pipe with the springs attached to the inner surface onto the exhaust pipe while the second downwardly extending wave part of the springs is passed onto the exhaust pipe while also maintaining dimensional stability of the spring. The radius at the fifth bend zone is preferably as large as possible to avoid any higher assembly force. The radius of the fifth bending zone can be large because the pointy ends at the end gripping part which grip into the help in stabilizing the connection between the tail pipe and the exhaust pipe.

The first bending zone may have a bending radius (at the lower side of the spring) of 1.0 mm to 2.0 mm, and preferably 1.4 mm to 1.6 mm because a bending radius which is as small as possible will provide stiffness to the spring in the area of the angle between the connection part and the first inclined spring part of the first downwardly extending wave part.

Preferably, the fourth and the seventh bending zone each have a bending radius (at the lower side of the spring) of 1.0 mm to 4.5 mm, or preferably 1.5 mm to 3.5 mm in order to provide sufficient tension in the spring while also avoiding that the spring leaves marks in the tail pipe.

In addition, the barbs influence the assembly force needed for sliding the barbs against the surface meet the surface of the exhaust pipe, which requires an assembly force needed for pushing the tailpipe onto the exhaust pipe in a third step of up to 200-350 N or even lower.

The angle at which the distal end gripping part, i.e. the barbs, meets the outer surface is important for the force needed for pulling off the tail pipe. A high force for pulling off the tailpipe is required for eliminating any unintentional loss of the tail pipe during normal use of the vehicle. The initial pulling force, i.e. immediately after mounting, should be at least 250 N to prevent any unintentional demounting of the tail pipe, e.g. by theft or that the tail pipe falls off the exhaust pipe due to vibrations. In practice, the pull force is in the range of 350-650 N or even higher especially after some time after mounting of the tail pipe.

In addition, the angle of the barbs against the outer surface of the exhaust pipe influence the assembly force needed for sliding the barbs against the surface meet the surface of the exhaust pipe.

Thus, the angle at the seventh bend zone, i.e. between lower surfaces on the spring parts at the distal end gripping part and an upwardly extending spring part between the sixth and the seventh bend zone, is 35° to 45° before mounting the tail pipe on the exhaust pipe. This provides relatively low assembly force.

This initially provided angle is increased up to 45-90° when the tail pipe is mounted onto the exhaust pipe due to the tension from the spring resulting from the spring being squeezed between the outer surface of the exhaust pipe and the inner surface of the tailpipe when the tail pipe is mounted on the exhaust pipe. This results in deformation of the seventh bend zone and reduces the angle between the barbs and the outer surface of the exhaust pipe, whereby the barbs increases their effect and increases the pulling force needed for dismounting the tail pipe of exhaust pipe even further.

The distal end gripping part is initially angled at an angle of 75°-85° in relation to the longitudinal axis of the spring. If the initially provided angle is lower, the force acting on the barbs is reduced leading to a reduced barb effect against the exhaust pipe. If the angle is larger, the assembly force will increase.

Preferably the angle at the lower surface at the first bending zone is bent in an angle of 125° to 145° and preferably 130° to 140° in relation to the longitudinal axis of the spring, and/or the third bending zone is bent to provide an angle of 110° to 130° and preferably 115° to 125° on the upper surface of the spring in relation to the longitudinal axis of the spring. Preferably, the fourth bending zone is bent in an angle of 55° to 75° and preferably 60° to 70° at the lower surface of the spring, and/or the sixth bending zone is bent in an angle at the upper surface of the spring of 110° to 130° and preferably 115° to 125° in relation to the longitudinal axis of the spring. These the angles are selected from experience and should not vary more than 5-10 degrees. If the angle is large there is a risk of losing stability of the shape of the spring, whereas if the angle is small, the assembly force can increase.

The angles mentioned above also depended of the size of the bending radius on the relevant position of the relevant bending zone of the spring.

As mentioned above the springs are attached to the inner surface of the tailpipe. At least three, preferably at least four, in particular five or seven springs are attached to a tailpipe. The risk of misalignment of the tail pipe due to a defect spring is eliminated when five or seven spring members are used.

Alternatively the at least three, preferably at least four, in particular five or seven spring elements are attached to a ring member having an outer diameter corresponding to the inner diameter of the tailpipe.

Hereby it is possible to assemble the springs to the ring member separately and then attach the ring member into the tail pipe. The ring member with the springs attached thereto is fastened to the tail pipe by means of a mounting flange which retains the spring arrangement in position in the tail pipe. The mounting flange is attached to the tail pipe by means of e.g. one or more screws or bolts and nuts or studs or rivets through one or more holes in the tail pipe. This eliminates the need for welding the springs to the interior surface of the tailpipe at positions which may be hard to access due to the limited access through the tail pipe opening.

The spring element may have an arc shaped cross section, when seen in a cross section perpendicularly to the longitudinal axis of the spring element, where the arc shape of the upper surface of the spring element corresponds to the inner surface of the tail pipe. Thereby upper surface of the spring, in particular in the connection area and at the upper surface of the upwardly extending wave parts follows the tail pipe inner diameter which eliminates or reduces any risk of deformation in the tail pipe.

The spring is made of stainless steel, in particular a 18-8 Chromium-Nickel-austenitic stainless steel alloy. For example stainless steel X10CrNi 18-8 no 1.4310 as defined in the material norm EN 10088-2:2005 is suitable for springs according to the present invention when used for mounting a tail pipe on exhaust pipes of the steel types which are most commonly used in exhaust pipes. The spring tensile strength is 1000-1700 N/mm2 corresponding to grade +C1000 to +C1500 as defined in EN 10151:2002.

Typically, exhaust pipes are made of stainless steel types such as stainless steel X5CrNi18-10 no. 1.4301, X5CrNiMo17-12-2 no. 1.4401, X2CrTiNb18 or 1.4509 as defined in the material norm EN 10088-2:2005.

The spring steel strip may have a thickness of 0.4 to 1.0 mm and preferably 0.5 to 0.8 mm depending on the diameter of the exhaust pipe and the tail pipe and the required assembly and/or pull force.

The spring strip width, i.e. perpendicular to the longitudinal axis of the spring, is preferably in the range of 5 to 15 mm or preferably 8 to 12 mm depending on the diameter of the exhaust pipe and the tail pipe and the required assembly and/or pull force.

The overall length of the spring is depending on the size, in particular the length of the tail pipe and is preferably 50 to 100 mm. The length of the spring is preferably changed by varying the distance between the second and the third bending zone and/or between the fifth and the sixth bending zone. Usually, an overall length of the spring of 60 to 80 mm will be sufficient for the mounting of tail pipes on cars.

The spring may comprise an additional second downward wave part and an additional first upward wave part the between the first upward wave part and the second downward wave part, e.g. in case a long tail pipe is to be installed on the exhaust pipe. Hereby it becomes possible to provide a longer spring without compromising stability and assembly force and/or pulling force.

BRIEF DESCRIPTION OF THE DRAWINGS

The present invention will described in detail with reference to the drawings in which.

DETAILED DESCRIPTION OF THE PREFERRED EMBODIMENTS

The exhaust tailpipe mounting system for mounting of a tailpipe 1 on an exhaust pipe 2 end comprises a spring arrangement of at least three spring elements 3, preferably at least four, such as five or seven springs 3 which are to be attached to the tailpipe 1.

The springs are attached at their connection end part 9 to the inner surface 10 of the tail pipe 1, e.g. by welding, brazing or the like permanent attachment means (not shown). The springs 3 are mounted with the barbs 13 towards the outer end 26 of the tail pipe and the connecting part 9 towards the end from which the tail pipe 1 is mounted on the exhaust pipe 2.

Figure 2:
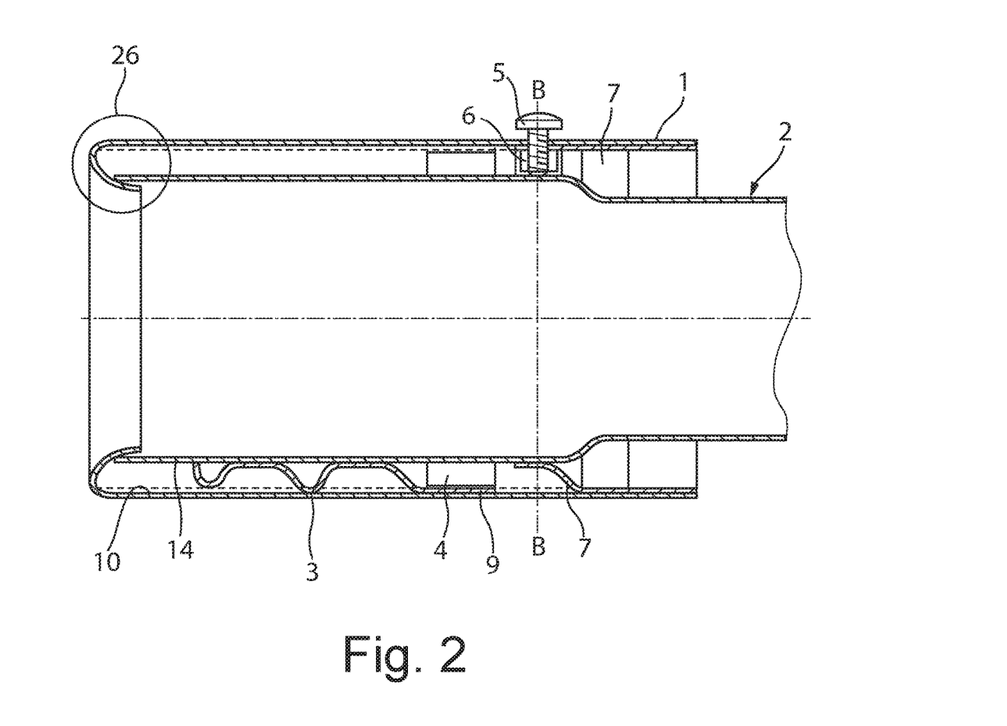
FIG. 2 shows a cross sectional view through A-A of FIG. 4 of a tail pipe mounted on an exhaust pipe using the spring based mounting arrangement according to the invention.
Figure 3:
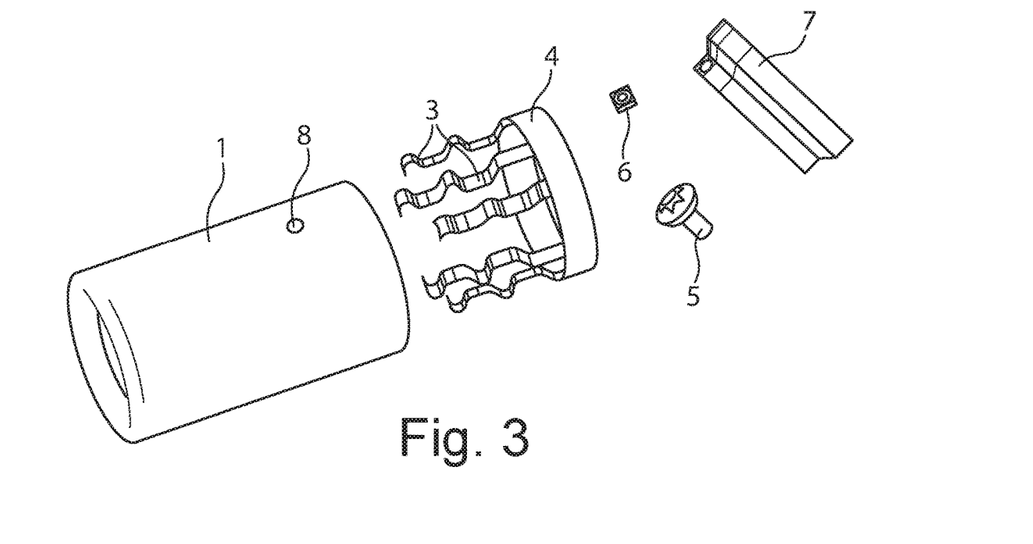
FIG. 3 shows an exploded view of an embodiment of the tail pipe mounting system
Figure 4:
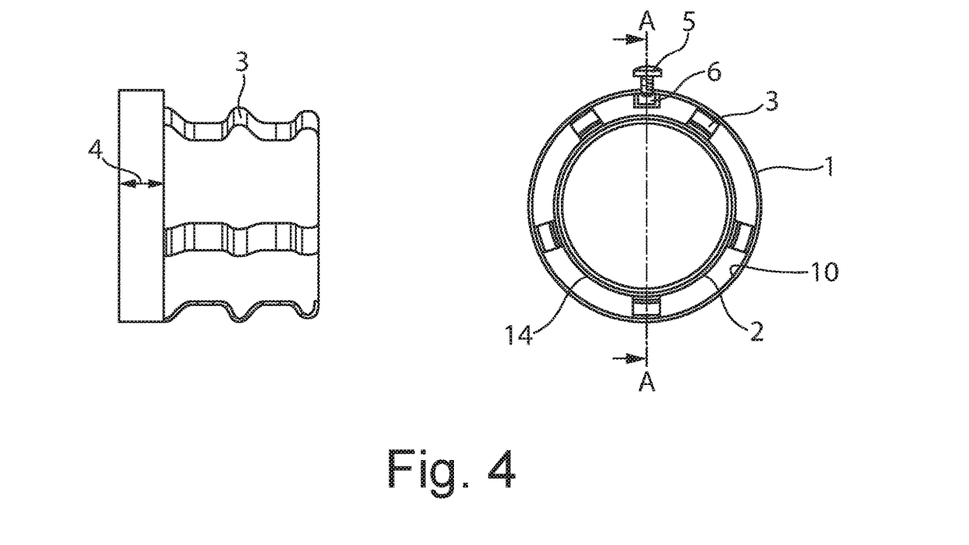
FIG. 4 shows a cross sectional view through B-B of FIG. 2 of a tail pipe mounted on an exhaust pipe using the spring based mounting arrangement according to the invention.

Alternatively the at least three, preferably at least four, in particular five or seven springs 3 are attached to a ring member 4 as shown in FIGS. 2-4. The ring member has an outer diameter corresponding to the inner diameter of the tailpipe 1. The ring member is arranged in the tailpipe 1 and fastened to the tail pipe 1 by means of a mounting flange 7 which retains the spring arrangement in position in the tail pipe 1. The mounting flange 7 is then attached to the tail pipe by means of e.g. one or more screws or bolts 5 and nuts 6 or studs or rivets through one or more holes 8 in the tail pipe 1.

When the springs 3 are attached to the tail pipe 3 the tail pipe 3 is simply pushed onto the end of the exhaust pipe 2 for mounting of the tail pipe. Thus, during mounting of the tailpipe 1, the first downwardly extending wave part 16 of the spring engages the exhaust pipe at first, resulting in an initial assembly force needed for assembly. Then the second downwardly extending wave part 21 and finally the barbs 13 at the distal end engages the exhaust pipe's 2 outer surface 14 resulting in an intermediate increase in the assembly force and the final assembly force.

The springs 3 are thus arranged between the tailpipe 1 and the exhaust pipe 2 when mounted. The upwardly extending wave parts 19, 24 rest against the inner surface of the tail pipe while the horizontal spring part of the downwardly extending wave parts 16, 21 rest against the outer surface 14 of the exhaust pipe 2 and provides a frictional grip against the outer surface of the exhaust pipe.

Figure 1:
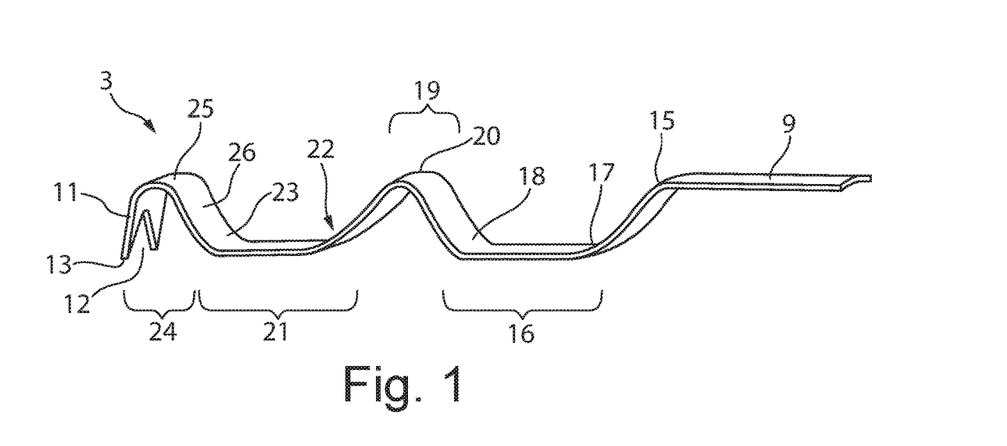
FIG. 1 shows a perspective view of a spring of a tail pipe mounting arrangement according to the present invention.
Figure 5:
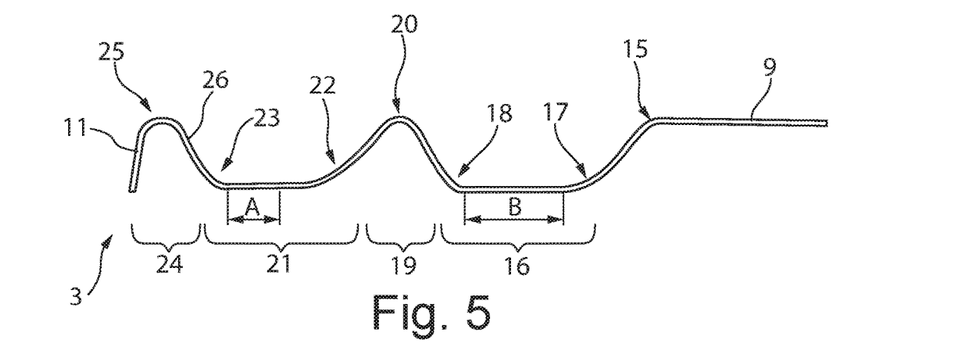
FIGS. 5 and 6 show a side view of a spring element used in a tailpipe mounting system according to the invention.
Figure 6:
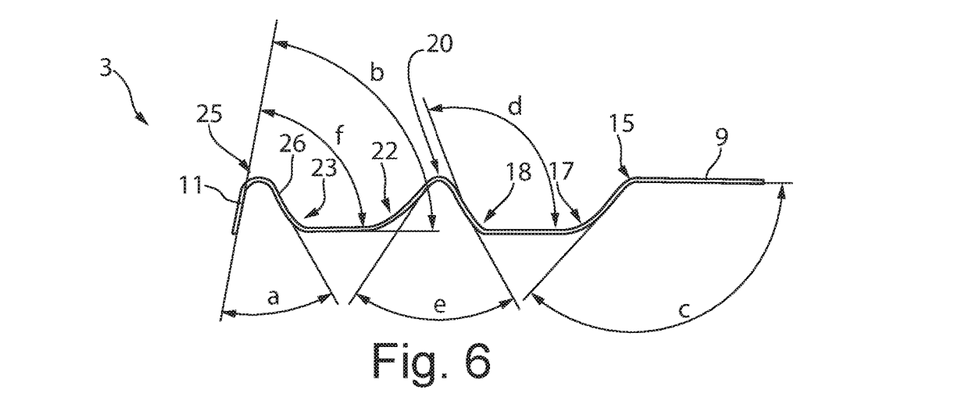

The spring design is seen in FIGS. 1 and 5-6.

Each spring element is bent into a wave shape having a generally W-like shape between a first end having a connection end part 9 intended for connection to an inner surface of a tailpipe, and a second, i.e. a distal end, end forming a distal end gripping part 11.

The spring element 3 may have an arc shaped cross section, when seen in a cross section perpendicularly to the longitudinal axis of the spring element 3. The arc shape of the upper surface of the spring 3 corresponds to the diameter of the inner surface of the tail pipe 1.

The distal end gripping part 11 comprises at least one cut-out 12 at the distal end of the spring for forming at least one and preferably two pointy ends 13, which act as barbs 13 intended for digging into an outer surface 14 of the exhaust pipe 2.

The W-like shape between the first end and the second ends of the spring 3 is provided by bending a rectangular spring steel member at a number of bend zones. The bends zones are provided perpendicularly or substantially perpendicularly to the longitudinal axis of the spring element 3.

The bend zones will be described in order from the connection end part 9 towards the distal end gripping part 11.

The first bend zone 15 connects the connecting end part 9 and a first downward wave part 16. The first bending zone 15 may have a bending radius (at the lower side of the spring) of 1.0 mm to 2.0 mm, and preferably 1.4 mm to 1.6 mm. A bending radius which is as small as possible at the first bend zone 15 will provide stiffness to the spring in the area.

The first downward wave part 16 comprises a second 17 and a third 18 bend zone resulting in a downward inclined spring part, a horizontal spring part and an upwardly inclined spring part.

The second bend zone 17 has a bending radius (at the lower side of the spring) of 2.5 mm to 5.5 mm, preferably 4.5 mm to 5.5 mm. The second bend zone 17 is the first part of the spring which contacts the outer surface 14 of the exhaust pipe when mounting the tail pipe. The contact resulting in an initial assembly force of approximately 100-200 N needed for sliding the lower surface of the first downward wave part 16 over outer surface 14 of the exhaust pipe 1. An increase in the bending radius at the second bend zone 17 decreases the initial assembly force needed for pushing the tail pipe with the springs attached to the inner surface onto the exhaust pipe.

The third bend zone 18 has a bending radius (at the upper side of the spring) of 2.0 mm to 3.0 mm, and preferably 2.4 mm to 2.6 mm in order to maintain shape and stiffness of the spring.

The first downward wave part 16 is followed by a first upward wave part 19 having a fourth bend zone 20 which connects the inclined spring parts of the first 16 and the second 21 downwardly extending wave parts of the spring.

The first upwardly extending wave part 19 of the spring is intended for resting against the inner surface 10 of the tail pipe 1. The fourth bending zone 20 has a bending radius (at the upper side of the spring) of 1.0 mm to 4.5 mm, or preferably 1.5 mm to 3.5 mm.

The second downward wave part 21 has a fifth bend zone 22 and a sixth bend zone 23 resulting in a downward inclined spring part, a horizontal spring part and an upwardly inclined spring part 26 which provides the second downwardly extending wave shape. The bending radius (at the upper side of the spring) at the fifth bend zone 22 is at least 8.0 mm, preferably 8.0 mm to 15 mm, or more preferred 10.5 mm to 12.5 mm. Hereby the assembly force in the second step is approximately 100-200 N. The second downwardly extending wave part 21 is intended for resting against the outer surface 14 of the exhaust pipe 2 and align the tail pipe 1 on the exhaust pipe 2. The size of the radius at the fifth bend zone 22 is important for reducing the stepwise intermediate increase in the assembly force when the horizontal part of the second downwardly extending wave part of the springs is passed into contact with the outer surface of the exhaust pipe as explained above.

The fifth bend zone 22 is the first part of second downward wave part of the spring which contacts the outer surface of the exhaust pipe when mounting the tail pipe resulting in an intermediate increase of the assembly force needed for sliding the lower surface of the second downward wave part over the outer surface of the exhaust pipe.

The sixth bend zone 23 preferably has a bending radius (at the lower side of the spring) of 2.0 mm to 3.0 mm, and preferably 2.4 mm to 2.6 mm in order to maintain shape and stiffness of the spring and thus also sufficient tension to the spring to allow proper alignment of the tail pipe 1 in relation to the exhaust pipe 2 when mounted thereon.

The second downward wave part 21 is followed by a second upwards wave part 24 with a seventh bend zone 25, which connects the second downward wave part 21 and the distal end gripping part 11. The second upwardly extending wave part 24 is also intended for resting against the inner surface 10 of the tail pipe 1.

Preferably, the seventh bending zone 25 has a bending radius (at the upper side of the spring) of 1.0 mm to 4.5 mm, or preferably 1.5 mm to 3.5 mm.

The seventh bend zone 25 connects the distal end gripping part 11 to an upwardly extending spring part 26 between the sixth 23 and the seventh 25 bend zone at an angle a of 35° to 45°.

The distal end gripping part 11 is angled at an angle b of 75° to 85° in relation to the longitudinal axis of the spring.

The second downwardly extending wave part 21 and the and outermost second upwardly extending wave part 24 build up the force acting on the barbs 13 at the gripping part 11 and thus assists in increasing the barbs grip force into the exhaust pipe's outer surface 14.

In addition, the barbs 13 influence the assembly force needed for sliding the barbs 13 against the surface meet the surface of the exhaust pipe, whereby the assembly force needed for pushing the tailpipe 1 onto the exhaust pipe 3 in a third step of up to 200-350 N.

The angle b at which the distal end gripping part 11, i.e. the barbs 13, meets the outer surface 14 of the exhaust pipe 2 is important for the force needed for pulling off the tail pipe. A high force for pulling off the tailpipe is required for eliminating any unintentional loss of the tail pipe during normal use of the vehicle. The initial pulling force required is at least 250 N on an exhaust pipe.

In addition, the angle b of the barbs 13 against the outer surface 14 of the exhaust pipe influence the assembly force needed for sliding the barbs 13 against the outer surface of the exhaust pipe.

Thus the angle a at the seventh bend zone 25, i.e. between lower surfaces on the spring parts at the distal end gripping part 11 and an upwardly extending spring part 26 between the sixth 23 and the seventh 25 bend zone, is 35° to 45° before mounting the tail pipe on the exhaust pipe. This provides relatively low assembly force.

Figure 7:
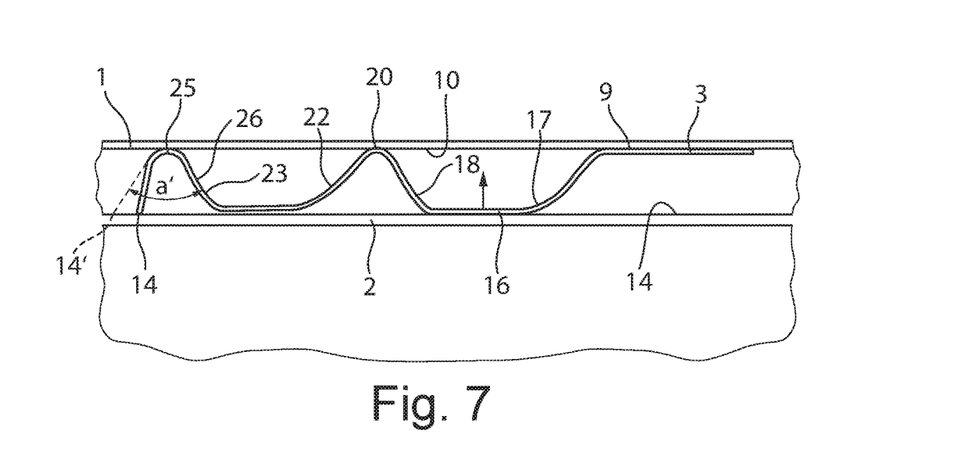
FIG. 7 shows a detail of the spring in cross sectional view of a tail pipe mounted on an exhaust pipe using the spring based mounting arrangement according to the invention.

This initially provided angle a is increased up to 45-90° as illustrated on FIG. 7, see angle a' when the tail pipe 1 is mounted onto the exhaust pipe 2 caused by the tension from the spring resulting from the spring 3 being squeezed between the outer surface of the exhaust pipe 2 and the inner surface 10 of the tail pipe 1 when the tail pipe is mounted on the exhaust pipe. This results in deformation of the seventh bend zone 25 and reduces the angle a to a' between the barbs 13 and the outer surface of the exhaust pipe, whereby the barbs 13 increases their effect and decreases the pulling force needed.

The second upward wave part of the spring is preferably provided at a height which is approximately 0.4-0.5 mm lower than the level of first upward wave part and the connection end part. This provides a slip, which reduces the assembly force when the barbs are pushed across the outer surface of the exhaust pipe during mounting. The tension provided on the spring when it is squeezed between the tail pipe and the exhaust pipe causes an upward movement of the upwardly inclined surface 26 which eliminates the slip and provides contact between the inner surface of the tail pipe and the upper surface on the second upward wave part. This causes a further tension on the barbs 13 which further increases the pull force needed for pulling off the tail pipe 1.

Preferably the angle c at the lower surface at the first bending zone is bent in an angle of 125° to 145° and preferably 130° to 140° in relation to the longitudinal axis of the spring.

Preferably, the third bending zone 18 is bent to provide an angle d of 110° to 130° and preferably 115° to 125° on the upper surface of the spring in relation to the longitudinal axis of the spring.

Preferably, the fourth bending zone 20 is bent in an angle e of 55° to 75° and preferably 60° to 70° at the lower surface of the spring.

Preferably, the sixth bending zone 22 is bent in an angle f at the upper surface of the spring of 110° to 130° and preferably 115° to 125° in relation to the longitudinal axis of the spring.

These the angles are selected from experience and should not vary more than 5 to 10 degrees. If the angle is large there is a risk of losing stability of the shape of the spring, whereas if the angle is small, the assembly force can increase.

The angles mentioned above also depended of the size of the bending radius on the relevant position of the relevant bending zone of the spring.

If the tailpipe is pulled off, the springs 3, or at least the gripping part 11 thereof will be deformed due to the pulling force needed.

EXAMPLE

The assembly force and the pulling force was tested on springs of two different designs. Spring 1 is designed according to the present invention, whereas spring 2 is a comparative example.

Five springs were welded to the inner circumference of a tail pipe at equal distance as described above.

Spring 1 is made of stainless steel which is bent into shape as shown in FIGS. 1 and 5-6. Spring 2 of the comparative example is of same length and width and differs from spring 1 in the bend radius's of the bending zones as well as the angle a of the hook like end part. The bend radius of each bend zone and the angle appears in Table 1 below.

Spring material is a strip of 67.5 mm length and 9 mm width. The barbs are made by providing a cutout of a triangular shape and a 90° angle in the distal end of the spring strip. Spring steel material is austenitic stainless steel alloy X10CrNi 18-8 no 1.4310 as defined in the material norm EN 10088-2:2005. The spring tensile strength is 1000-1700 N/mm2 corresponding to grade +C1000 to +C1500 as defined in EN 10151:2002.

TABLE 1

| | Shape of spring 1 and 2 | |
|---|---|---|
| Angle or Bend zone | Spring 1, radius on upper side of spring (L = lower side; U = upper side bend radius); angle | Spring 2 radius on upper side of spring; angle |
| Bend zone 1 | 2.0 mm (L) | 2.0 mm (L) |
| Bend zone 2 | 5.0 mm (L) | 2.0 mm (L) |
| Bend zone 3 | 2.5 mm (U) | 2.0 mm (U) |
| Bend zone 4 | 2.0 mm (U) | 2.0 mm (U) |
| Bend zone 5 | 11.7 mm (U) | 2.0 mm (U) |
| Bend zone 6 | 2.5 mm (L) | 2.0 mm (L) |
| Bend zone 7 | 2.76 mm (U) | 2.0 mm (U) |
| Angle a | 40° | 55° |

An exhaust test pipe of stainless steel X5CrNi 18-10, no 1.4301, as defined in the material norm EN 10088-2:2005 was mounted vertically in a test bench using fixture. The tail pipe was mounted in a first fixture on the lower side of a vertical piston. The assembly force was measured by the piston applying a pushing a force to the tail pipe from above while detecting the assembly force (i.e. push force; in N as a function of the distance) used for pushing the tail pipe into position on the exhaust pipe. After completion of the mounting of the tailpipe a second test fixture was mounted on the tailpipe. The second test fixture engages the lower end of the tail pipe while raising the piston for providing a pulling force in the tail pipe while detecting the pull force (in N as a function of the distance). Five runs with tail pipes with spring 1 and five runs with spring 2 were carried out and the average values were calculated for the initial assembly force (first downward wave in contact with exhaust tube); intermediate assembly force (second downward wave in contact with exhaust tube) and final assembly force (barbs in contact with exhaust tube) and the averaged pull force was calculated for each run. The overall average of the pulling force on the five runs was then calculated. The averaged values appear in Table 2.

TABLE 2

| Average assembly force/pulling force in N | | |
|---|---|---|
| Position | Spring 1 (N) | Spring 2 (N) |
| First downward wave (*1) | 153 | 340 |
| Second downward wave (*2) | 156 | 490 |
| Barbs (*3) | 271 | 410 |
| Pulling force, Average (*4) | 544 | 557 |

Figure 8:
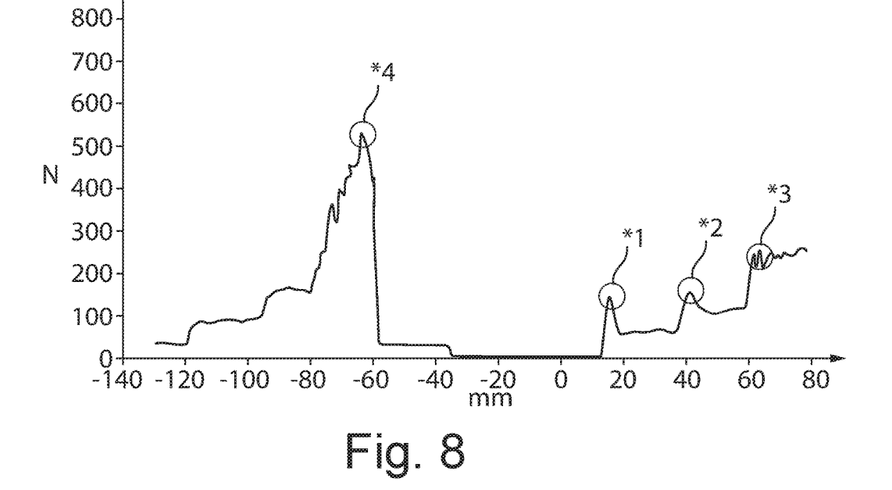
FIGS. 8 and 9 show graphs of the assembly force and the pulling force as a function of the distance.

FIG. 8 shows the assembly force as a function of the distance of the first run with spring 1 and 2 respectively. *1 illustrates the initial assembly force used when the first downward wave part of the springs come into contact with the exhaust pipe. *2 illustrates the intermediate assembly force used when the second downward wave part come into contact with the exhaust pipe. *3 illustrate the initial assembly force used when the barbs of the springs come into contact with the exhaust pipe. *5 illustrate the maximal pulling force used when pulling the tail pipe off the exhaust pipe.

Figure 9:
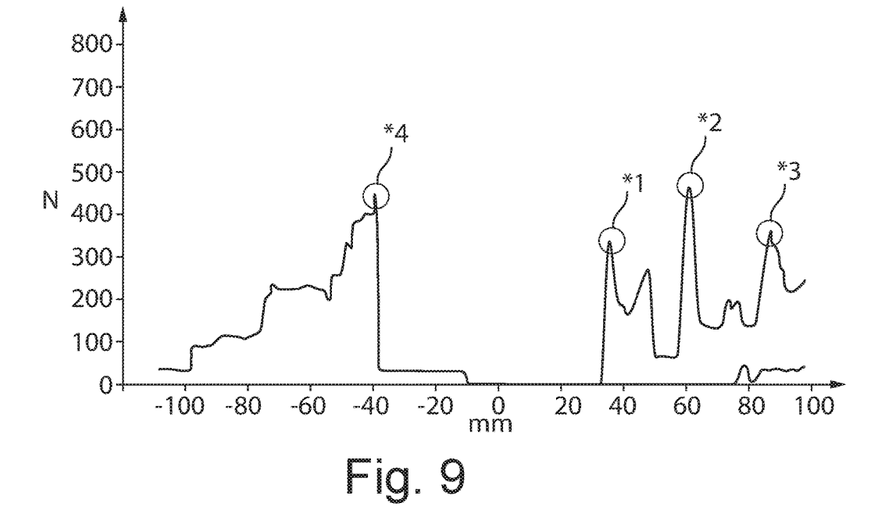

It is clear from Table 2 and FIGS. 8 and 9 that spring 1 design requires a lower assembly force while maintaining a high pulling force.

What is claimed is:

1. An exhaust tailpipe mounting system for mounting of a tailpipe on an exhaust pipe end, said exhaust tailpipe mounting system comprising:
    a spring arrangement of at least three spring elements which are attachable to the tailpipe, wherein each spring element extends generally along a longitudinal axis and is bent into a wave shape and comprises a first end having a connection end part configured for connection to an inner surface of the tailpipe and a second end forming a distal end gripping part, the distal end gripping part comprising at least one cut-out forming at least two pointy ends, where the pointy ends of the distal end gripping part are configured to grip into an outer surface of the exhaust pipe end;
    wherein the wave shape of each of the at least three spring elements comprises:
        a first bend zone between the connecting end part and a first downward wave part, where the first downward wave part comprises a second bend zone and a third bend zone, where the second bend zone has a bending radius of 2.5 mm to 5.5 mm and the third bend zone has a bending radius of 2.0 mm to 3.0 mm;
        a first upward wave part having a fourth bend zone;
        a second downward wave part having a fifth bend zone and a sixth bend zone, where the fifth bending radius is at least 8.0 mm and where the sixth bend zone has a bending radius of 2.0 mm to 3.0 mm;
        wherein the second downward wave part is followed by a second upwards wave part having a seventh bend zone, wherein the second upwards wave part connects the second downward wave part and the distal end gripping part,
        wherein an upwardly extending spring part is defined between the sixth and the seventh bend zones;
        wherein the seventh bend zone connects the distal end gripping part to the upwardly extending spring part at an angle of 35° to 45°; and
        wherein the distal end gripping part is angled at an angle of 75° to 85° in relation to the longitudinal axis of the spring elements.

2. The exhaust tailpipe mounting system according to claim 1, wherein the at least three spring elements are attached to a ring member having an outer diameter corresponding to an inner diameter of the tailpipe.

3. The exhaust tailpipe mounting system according to claim 2, wherein the at least three spring elements comprise at least four spring elements.

4. The exhaust tailpipe mounting system according to claim 2, wherein the at least three spring elements comprise at least five spring elements.

5. The exhaust tailpipe mounting system according to claim 2, wherein the at least three spring elements comprise at least seven spring elements.

6. The exhaust tailpipe mounting system according to claim 1, wherein each of the spring elements have an arc shaped cross section when seen in a cross section perpendicularly to the longitudinal axis of each spring element, and where the arc shape of an upper surface of each spring element corresponds to the inner surface of the tail pipe.

7. The exhaust tailpipe mounting system according to claim 1, wherein the first bending zone has a bending radius of 1.0 mm to 2.0 mm.

8. The exhaust tailpipe mounting system according to claim 1, wherein the fourth and the seventh bending zones each have a bending radius of 1.0 mm to 4.5 mm.

9. The exhaust tailpipe mounting system according to claim 1, wherein the fourth and the seventh bending zones each have a bending radius of 1.5 mm to 3.5 mm.

10. The exhaust tailpipe mounting system according to claim 1, wherein the first bending zone is bent in an angle of 125° to 145°, the third bending zone is bent in an angle of 110° to 130°, the fourth bending zone is bent in an angle of 55° to 75°, and/or the sixth bending zone is bent in an angle of 110° to 130°.

* * * * *